(12) United States Patent
Jackson et al.

(10) Patent No.: US 6,744,151 B2
(45) Date of Patent: Jun. 1, 2004

(54) MULTI-CHANNEL POWER SUPPLY SELECTOR

(75) Inventors: Jane Patricia Jackson, Edinburgh (GB); Roger Charles Peppiette, Edinburgh (GB)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/242,978

(22) Filed: Sep. 13, 2002

(65) Prior Publication Data

US 2004/0051384 A1 Mar. 18, 2004

(51) Int. Cl.[7] .................................................. H02J 1/00
(52) U.S. Cl. ............................ 307/43; 307/52; 307/113
(58) Field of Search ............................... 307/43, 52, 64, 307/85, 86, 87, 113, 134, 135

(56) References Cited

U.S. PATENT DOCUMENTS

| | | | |
|---|---|---|---|
| 3,973,207 A | * 8/1976 | Sugizaki | 455/179.1 |
| 4,419,723 A | * 12/1983 | Wilson, Jr. | 363/21.12 |
| 4,847,742 A | * 7/1989 | Ohashi et al. | 363/21.14 |
| 5,187,396 A | * 2/1993 | Armstrong et al. | 327/65 |
| 5,550,497 A | * 8/1996 | Carobolante | 327/110 |
| RE36,179 E | * 4/1999 | Shimoda | 327/407 |
| 5,963,019 A | * 10/1999 | Cheon | 320/150 |
| 5,978,235 A | * 11/1999 | Lampinen | 363/21.16 |
| 6,002,295 A | * 12/1999 | Gens et al. | 327/546 |
| 6,153,947 A | 11/2000 | Rockow et al. | |
| 6,301,133 B1 | 10/2001 | Cuadra et al. | |
| 6,552,917 B1 | * 4/2003 | Bourdillon | 363/21.21 |
| 6,566,935 B1 | * 5/2003 | Renous | 327/408 |

* cited by examiner

Primary Examiner—Gregory J. Toatley, Jr.
Assistant Examiner—Sharon A. Polk
(74) Attorney, Agent, or Firm—Wolf, Greenfield & Sacks, P.C.

(57) ABSTRACT

A multi channel power supply detector for selecting one of a plurality of power supplies is provided. The supply selector includes a controller, and each channel has a switching device responsive to the controller in series with a current limiting device responsive to the controller.

19 Claims, 3 Drawing Sheets

MULTI-CHANNEL POWER SUPPLY SELECTOR

FIELD OF THE INVENTION

The present invention relates to a multi-channel power supply selector for selecting one of a plurality of power supplies for use in a high availability multi-redundancy power supply system.

BACKGROUND OF THE INVENTION

FIG. 1 schematically illustrates a prior art arrangement in which two power supplies A and B, are connected to an output node O via a "diode—OR" arrangement comprising first and second diodes 2 and 4. In the arrangement shown, which is typically for use in the telecommunications industry, each of the supplies A and B has a nominal output voltage of −48 volts in the USA and −60 volts in Europe, and hence the diode OR arrangement selects the most negative of the supplies. A hotswap device 6 is also provided in order to control the board inrush current that occurs when a newly swapped board is first connected to the power supply. The inrush current results from the rapid charging of previously discharged capacitors on the board. The hotswap control 6 performs a current limiting function in order to prevent an excessive inrush current from occurring. Such in-rush currents can cause damage to components and circuit board tracks in the current path and may also give rise to voltage spikes on the power supplies and which might be communicated to other equipment in the telecommunications system (not shown) In a known improvement of the prior art system, each of the diodes 2 and 4 is replaced by a synchronous rectifier, ie a MOSFET transistor, and a control circuit such that the MOSFET for the most negative supply is switched fully on and the MOSFET for the other supply is switched fully off. Thus, the functionality of the diodes is completely replicated, but without incurring the penalty of a diode voltage drop across a conducting diode.

SUMMARY OF THE INVENTION

According to a first aspect of the present invention there is provided a multi-channel power supply selector for selecting one of a plurality of power supplies for connection to a load, comprising of at least one controller and the plurality of channels; each channel comprising a first device responsive to the controller and operated as a switching device for selecting a power supply connected to said channel in series with a second device operating as a current limiting device or a further switching device responsive to the controller.

It is thus possible to provide a selection system in which a plurality of identical channels are provided, each comprising a first device functioning as a selection device and a second device as a switching and/or current limiting device. This has the advantage that, should one of the power supplies become too negative to be usable, then even if the first device becomes unable to disconnect the power supply due to its parasitic source—drain diode, the second device in that channel can be operated in order to cause an effective disconnection of the power supply from the load. This contrasts with the prior art arrangement shown in FIG. 1 where if a fault should occur on power supply A such that it becomes highly negative in voltage but out of the safe operating range whilst simultaneously B is still acting as a good supply, then supply A will be selected in preference to B thereby resulting in potential damage to the equipment connected at the output node O or unnecessary tripping of any subsequent over-voltage detection circuitry.

Advantageously the first devices are semiconductor devices. The use of semiconductor devices, such as transistors, gives rise to a much faster switching action than could be achieved with electromechanical devices. Advantageously the switching devices are field effect transistors, FETs. Field effect transistors can, in general, be switched hard on giving rise to low voltage drops $V_{DS\ ON}$ as a result of their low effective on resistance $R_{DS\ ON}$.

Advantageously the second devices, which serve as current limiting devices are also field effect transistors.

In terms of field effect transistor technology, MOSFET transistors are currently preferred, and this term encompasses subgroups of MOSFET construction such as VMOS.

MOSFET transistors include an internal source drain diode which can be regarded as a parasitic diode resulting from conduction from the source to the drain via the transistor substrate and who's presence is a consequence of the way these devices are fabricated. This has the consequence that if the drain becomes more negative than the source then there is a current path from the source to the drain irrespective of the voltage applied to the transistor's gate. This is because even though the transistor itself is off, its parasitic diode has become conducting. In the present invention this problem is overcome as in each channel first and second MOSFET transistors are provided in back-to-back configuration. In the preferred embodiment of the invention the source of one transistor connected to the source of the other transistor. This ensures that irrespective of the voltages occurring at the load or the power supply, the internal source drain diode in one of the transistors will be reversed biased and hence no current path exists between the load and the supply. Given that the power supplies associated with telecommunications equipment are nominally rated at −48 volts but may produce voltages as low as −80 volts, then it might be assumed that the power supply selection controller would have to be fabricated, for example as an integrated circuit, in order to withstand at least 80 volts across the chip. In fact the energy stored in on-card inductances can give rise to large voltage spikes as the card is removed and therefore fabrication technologies capable of surviving transient voltages in excess of 150 or 200 volts are required. However, the inventors have realised that with a modification of the circuit topology the voltage appearing across the controller can be much reduced. This has the advantage that dissipation within the device will also be reduced and that also lower voltage fabrication technologies can be used. In particular where the power supply selection controller is formed from a plurality of sub-controllers each controller has one power supply connection to ground via a voltage dropping element, such as a resistor, such that the voltage appearing across the controller itself is significantly reduced. Furthermore, by having a second power supply connection to a node positioned intermediate the series connected transistors it is possible to ensure that the controller can always produce a gate voltage equal to the lower one of the source voltages of the associated transistors (via the parasitic source drain diodes) thereby being in a position to switch them off.

Advantageously each channel is provided with its own sub-controller, and the controllers communicate with one another in order to form a combined control system. Advantageously the controllers communicate via a differential current communications link such that the absolute voltage of one controller with respect to the other call float.

Preferably one of the controllers functions as a master controller and is provided with a representation of the voltage of each of the power supplies. The voltage may be divided via potential divider in order to protect the controller from having to see large voltages. The pickup point for the voltages does not have to be at the output of the respective power supplies, but can in fact be at the node between the first and second serially connected transistors in each one of the power supply channels. A connection at this point works since, if a power supply becomes more negative than the other power supply the parasitic diode within the MOSFET directly connected to the power supply conducts in forward bias therefore causing the power supply voltage to be "visible" to the selection circuit.

Advantageously each controller is arranged such that, in the event that the power supply it is monitoring is disconnected or fails, the controller can still receive power via a current flowing from the output node back through the second transistor's source-drain diode to the supply connection of the controller. Furthermore, placing the supply connection at the junction between the first and second serially connected field effect transistors, rather than at the output node, has the advantage that the internal voltage seen by the controller is not perturbed in the event that the controller has to operate the second transistor in order to perform a current limiting in order to maintain an inrush current within an acceptable range. Also, even if the power supply in the channel monitored by the master controller becomes faulty, the master controller itself will still receive a supply in order that it can perform a master/slave comparison and instruct the slave to take over if it can.

According to a second aspect of the present invention, there is provided a power supply selection control system, comprising a first controller having first and second outputs for controlling first and second serially connected field effect transistors disposed between a first power supply and an output node; a second controller having first and second outputs for controlling first and second serially connected field effect transistors disposed between a second power supply and the output node, and wherein in each channel the field effect transistors are connected such that the internal source-rain diodes thereof are connected in mutual opposition.

It is thus possible to provide a power supply selection system in which disconnection of a power supply is ensured irrespective of the voltage it outputs, whether in a functioning or a fault mode.

BRIEF DESCRIPTION OF THE DRAWINGS

The present invention will further be described, by way of example only, with reference to the accompanying drawings in which:

FIG. 2 schematically illustrates a circuit configuration of a high availability power supply offering dual channel redundancy and constituting an embodiment of the present invention. Nodes A and B represent connections to first and second power supplies. Each power supply has a nominal output voltage of −48 volts, but the output voltage may rise as high as 0 volts in the event that the power supply fails completely and might in use drop as low as −100 volts in a fault mode. In fact, if we allow for the possibility of the supply being connected the wrong way round, then the voltage seen may rise as high as +100 volts.

DETAILED DESCRIPTION

Figure 1:
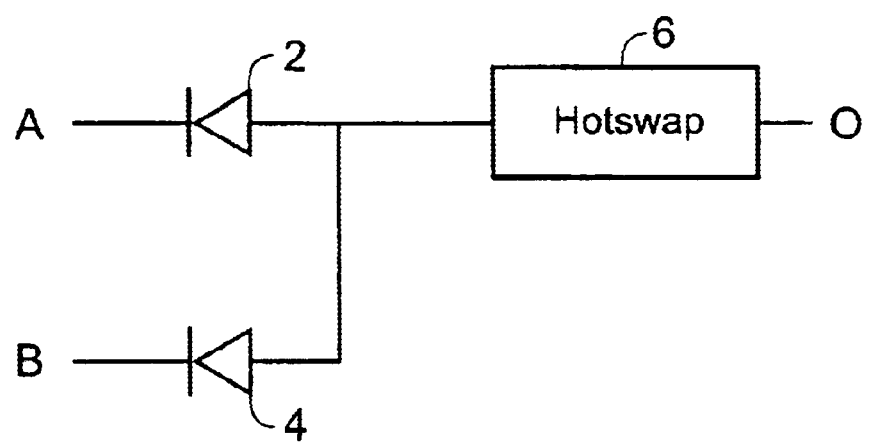
FIG. 1 is a schematic representation of a prior art dual redundancy power supply selector.

Each selection and hotswap controller 12 and 14 is tasked with ensuring that the most appropriate power supply is connected to a load (not shown) at any given time via an output node O. In general, this means that the power supply with the most negative output voltage (that is the largest magnitude of output voltage) is connected to the load provided that the output voltage of the power supply falls within an acceptable range of voltages defined by window comparator within the selection and hotswap controllers 12 and 14.

The supply selector comprises two identical channels. A and B, and hence for convenience the description presented herein will concentrate on the structure of channel A. It can be seen that first and second MOSFETs 16 and 18 are connected between the node A and the load. The MOSFETs are connected back to back such that the source of MOSFET 16 is connected to the source of MOSFET 18 with the drain of MOSFET 16 being connected to the power supply A and the drain of the second MOSFET 18 being connected to the load. The selection and hotswap controller 12 has individual control connections to the gates of the MOSFETs 16 and 18 such that it can control them individually.

The selection and hotswap controller 12 has a first power supply connection 20 connected to ground 22 via a resistor 24. A second power supply connection 26, VEE, is connected to a node 28 formed between the source of the first MOSFET 16 and the source of the second MOSFET 18.

Each of the MOSFETs 16 and 18 includes an internal parasitic source drain diode 30 and 32, respectively. The existence of these diodes is used in order to ensure that the selection and hotswap controller 12 receives a suitably negative supply voltage at its supply line 26 thereby ensuring that the device operates correctly.

Channel B is identical to Channel A, and both channels output at a common output node O. Similar components will be designated with the reference numerals and marked by an apostrophe.

In use, the MOSFET 16 primarily functions as a power supply selection device, and a MOSFET 18 primarily functions both as a selection device and as an inrush current limiting device.

Consider a situation in which an acceptable voltage range spans from −32 to −76 volts, and in which supply A is at −50 volts and supply B is at −60 volts. Both supplies A and B are within an acceptable voltage window. In this situation supply B should be connected to the load and hence the MOSFET 16' and 18' are controlled by the selection and hotswap controller 14 of channel B to be in a conducting state. The MOSFETs 16 and 18 of channel A are switched to a non-conducting state by the selection and hotswap controller 12 of channel A. In this arrangement, the −60 volts of channel B occurs at the load and also, by virtue of the conduction through the parasitic diode 32 of MOSFET 18, at the node 28 between the MOSFETs 16 and 18 of the first channel. In fact it can be seen that with both MOSFETs 16 and 18 switched off, current flow from ground 22 via the internal circuitry of the selection and hotswap controller causes the voltage at the node 28 to rise towards zero volts until such time as either of the parasitic diodes 30 and 32 become forward biased. This then sets up a current path to either the supply A or the output node O, depending on which diode has become conducting. Thus, in this example the internal source drain diode 30 of the MOSFET 16 of channel A is reverse biased and hence the MOSFET can be controlled into a non-conducting state, thereby deselecting channel A. If the power supply B were to fail, raising to 0 volts, then the selection and hotswap controllers 12 and 14 would operate in unison via their communication link in order to switch the MOSFETs 16 and 18 on, thereby allowing the voltage from channel A to be supplied to the load. Simultaneously, the MOSFET 16' and 18' of channel B would be switched off. This causes the −50 volts from power supply A to be seen both at the load, and at the node 28' of channel B (less one diode drop voltage) by virtue of the parasitic diode 32' becoming forward biased, thereby ensuring that the internal source drain diode 30' of the MOSFET 16' is reversed biased, ensuring that there is no current flow between supply B and the node 28'.

A different situation arises when one of the channels becomes faulty in such a way that its output voltage drops dramatically. If we assume that initially channel A is at −50 volts and channel B is at 60 volts, then as described herein above the selection and hotswap controllers 12 and 14 operate in unison in order to ensure the channel A is deselected and channel B is selected. However, if channel B now drops to −100 volts, it becomes excessively negative and hence must be disconnected from the load. In this situation even if MOSFET 16' is switched off, conduction may occur via the internal source drain diode 30' which would become forward biased in these circumstances. However the inability to prevent conduction via the parasitic diode 30' (even though the transistor part of the MOSFET 16' is fully off) is not a problem as the selection and hotswap controller 14 operates to switch the MOSFET 18' fully off. There is no conduction from the load 0 to the node 28' since the parasitic source drain diode 32' is reverse biased under this condition, and also because of the voltage occurring at the node 28' would be equal to that of the supply voltage of channel B. Thus the selection and hotswap controller 14 will have access to a very negative (−100 volts) supply from which it can derive a signal to supply to the gate of MOSFET 18' in order to bias it hard off.

As noted above when a channel is deselected both of the FETs associated with the channel are turned off. When a channel becomes selected, both are turned on, but with the current limiting FETs 18 and 18' being turned on slightly later than the selection FETs 16 and 16' so that the isolating properties of the source-drain diode will not be compromised. Thus there is a short "break before make" period between turning one selection path off and turning the other path on. This period is kept sufficiently short in order to ensure that the load device does not discharge to a sufficient degree to compromise its operation.

Figure 2:
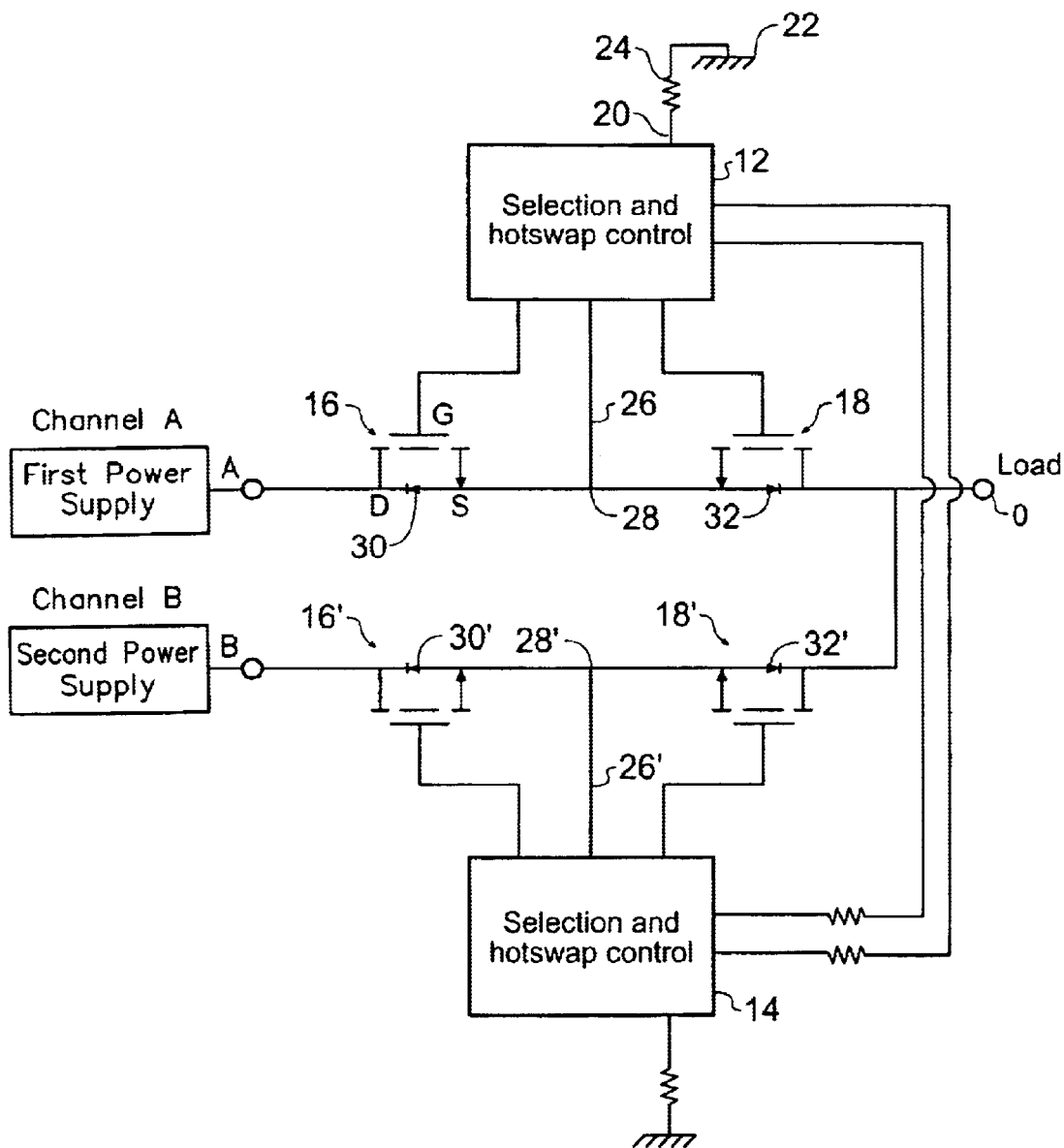
FIG. 2 is a schematic representation of a multi channel power supply selector constituting an embodiment of the present invention.
Figure 3:
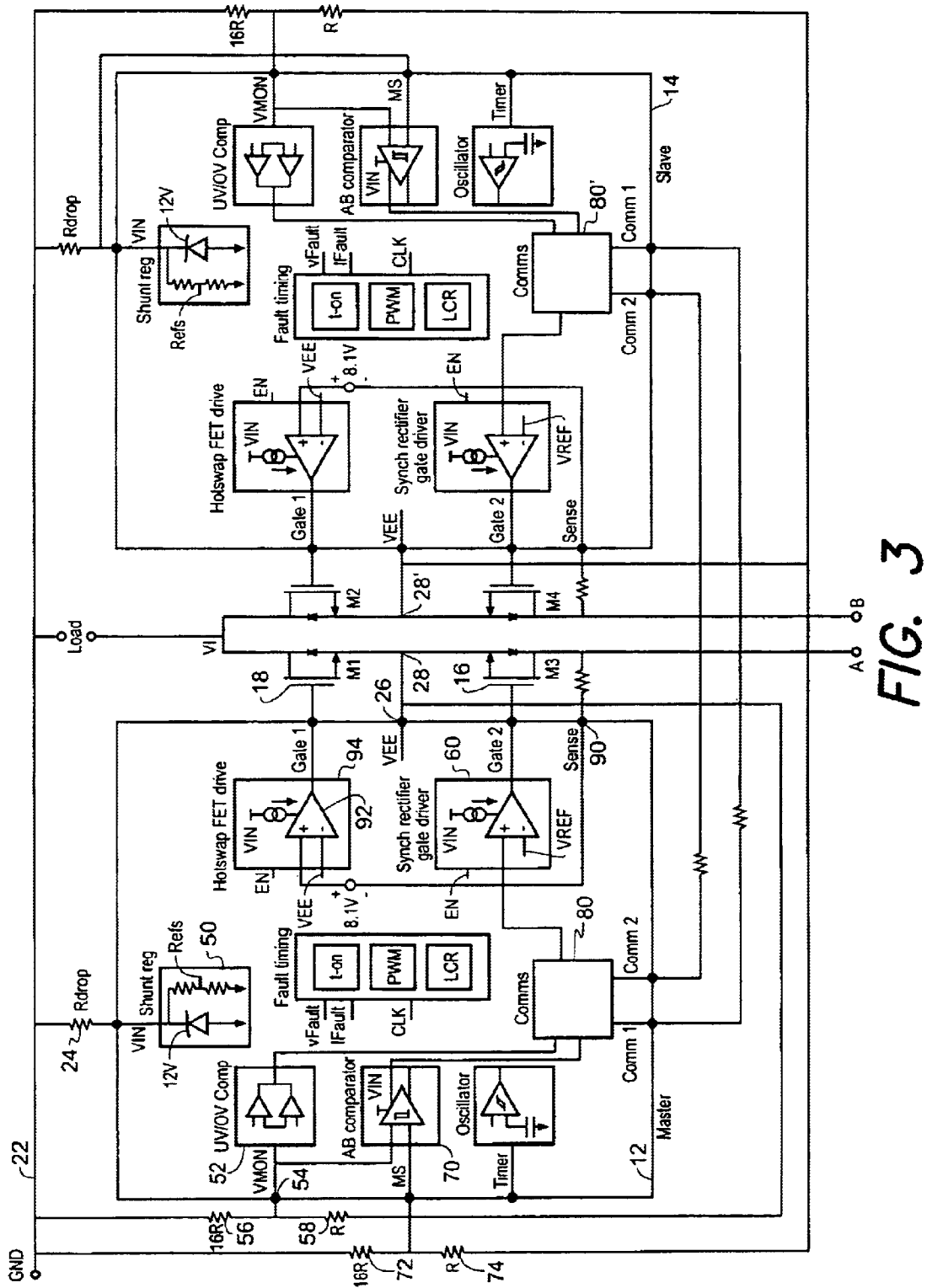
FIG. 3 illustrates the arrangement of FIG. 2 in greater detail.

FIG. 3 schematically shows the arrangement of FIG. 2 in greater detail. Again, for convenience, the description will concentrate primarily on the controller 12 of channel A.

As noted hereinbefore, the power supplies A and B may range anywhere between 0 and −100 volts with respect to ground. Furthermore, given that such equipment is primarily intended for the telecommunications market, and is hot-swappable there is also a need to withstand excess voltages which might occur as a result of inductive reactance of the board giving rise to transients as a board is removed. This would normally lead to the use of a fabrication process capable of withstanding voltages in the 150 to 200 volt range. However, the inventors have realised that with suitable circuit topology, the voltage seen across anyone of the controllers 12 or 14 can be significantly reduced. In the present embodiment, the voltage appearing across the controller is generally in the range of 10 to 12 volts and hence a much lower voltage fabrication technology can be used. This results in reduced dissipation within the controller and hence it can have a smaller foot print in the overall system. In order to achieve this, the controller 12 includes an internal shunt regulator 50 which uses a zener diode or a band-gap reference to maintain a voltage of approximately 12 volts across it, and this supply is then used to drive the other internal components of the selection and hotswap controller 12. The shunt regulator 50 is in series connection between the VEE pin which itself connects to node 28, and the ground supply 22 via a voltage dropping resistor 24. It follows that all of the voltage in excess of 12 volts between ground and VEE is dropped across the resistor 24.

The controller 12 also has a window comparator 52 which has an input node 54 which is connected to a voltage divider formed by a first resistor 56 which extends between the node 54 and the ground, and a second resistor 58 which extends between the node 54 and the node 28. It follows that the window comparator does not actually see the absolute voltage occurring at node 28. Instead, it sees the fraction of the voltage VEE dropped across the resistor 58. In this instance, resistor 58 is much smaller than resistor 56, in fact 16 times smaller, and hence the voltage difference occurring between node 54 and VEE is ¹⁄₁₇th of the absolute value of VEE. For this reason, the voltage seen by the window comparator 52 is proportional to the size of VEE even though the window comparator 52 is not referenced to ground. An output of the window comparator is supplied to a communications module 80 incorporating decision logic used to determine which supply should be connected to the load.

The selection and hotswap controller 12 also includes a comparator 70 for selecting whether channel A or channel B is to supply power to the load. Only one of the controllers 12 and 14 can act as the master, and in the arrangement shown in FIG. 3 controller 12 is arranged to act as the master controller. The comparator 70 receives a measurement of the voltage occurring at node 28 via the resistors 56 and 58 and also receives a measurement of the voltage occurring at node 28' via a comparable pair of resistors 72 and 74. The comparator is therefore able to determine which of the supplies has the lowest supply voltage. The comparator includes a degree of hysteresis in order to ensure that supply swapping doesn't occur when the voltage between the two supplies differs only slightly. In the embodiment shown in FIG. 3, the comparator is designed with approximately 4 volt hysteresis so that one supply must be two volts below the other before it is selected. The hysteresis also ensures that changes in the voltage midpoints (eg at nodes 28 and 28') due to switching on and off of FETs to swap supplies does not prompt the system to switch back again or to enter an unstable state. Some midpoint voltage fluctuation occurs because of the occurrence of resistive voltage drops occurring due to the flow of current and the possibility that a voltage diode drop will appear or disappear at a channel midpoint during switch-over. This perturbation must be less than the hysteresis level.

Given that the voltages to the window comparator 52 and the selection comparator 70 are provided via respective dividers having resistors in the ratio of 16 to 1, then if the window comparator has threshold levels of 2 and 4.4 volts respectively, this gives rise to under voltage and over voltage levels of 34 volts and 78.4 volts. The comparator 70 is designed to have an internal hysteresis of 235 mV, which gives rise to the external hysteresis of 4 volts due to the action of the potential dividers.

Given that controller 12 includes the channel selection comparator 70, it is necessary to communicate the decision of the comparator 70 to the second selection and hotswap controller 14. This is performed via a communications module 80 which communicates with the corresponding module 80 via a differential coding scheme. The differential coded scheme allows common mode current flows which may result because the controllers can float with respect to one another, to be ignored. The operation of the communications element 80 is described in greater detail in co-pending U.S. patent application Ser. No. 10/354,806.

As noted hereinbefore, the MOSFET 18 (and 18') is used to control the inrush current to a board during hotswap. In order to provide a measurement of the inrush current, the voltage drop occurring across the channel selection FET 16 is measured when the FET 16 is driven hard on. The on resistance of the FET 16 will be available from the manufacturer's data sheets and hence the FET 16 effectively constitutes a current measuring resistor. A sense connection is therefore made to the drain terminal 16 of the selection field effect transistor. The voltage difference between the VEE supplied voltage as measured at node 28 and the voltage as measured at the sense terminal 90 is supplied to an amplifier 92 in a hotswap FET drive circuit 94 and used to control the gate voltage applied to MOSFET 18. If the voltage becomes too big when the channel is selected, then the MOSFET 18 is driven to cause current limiting to occur.

It should be noted that if greater reliability is desired at the cost of increased component count, a sensing resistor can be placed between the MOSFET 16 and the node 28 and the sense terminal 90 can be connected to the node formed between the sense resistor and the MOSFET 16.

As noted hereinbefore, the circuit configuration is such that each channel is essentially identical, with a difference that channel B is configured as a slave by tying one of the pins of the channel comparator 70 therein to the internally derived positive supply voltage. Furthermore, the circuit topology is such that only a low voltage fabrication process need be employed. The realisation that the supply voltage need not be monitored at the supply, but can adequately be monitored by measuring the voltage occurring at the node between the transistors 16 and 18, coupled with realisation that the adverse effects of the parasitic drain source diodes could be used to good advantage has enabled the applicant to produce a high reliability multi-channel supply using a medium voltage fabrication process.

What is claimed is:

1. A multi-channel power supply selector for selecting one of a plurality of power supplies for connection to a load, the multi-channel power supply selector comprising a plurality of channels, each channel being connected between a respective one of the plurality of power supplies and the load, each channel comprising a controller and a first switching device responsive to the controller for selecting the respective a power supply connected to said channel, the first switching device being in series with a respective second switching device responsive to the controller.

2. A multi-channel power supply selector as claimed in claim 1, wherein said first and second switching devices are transistors.

3. A multi-channel power supply selector as claimed in claim 2, wherein said first and second switching devices are field effect transistors.

4. A multi-channel power supply selector as claimed in claim 1, wherein the second switching device of each channel is further operable in a current limiting mode.

5. A multi-channel power supply selector as claimed in claim 3, wherein the field effect transistors constituting the first and second switching devices are arranged such that internal source-drain diodes within the series connected transistors are in opposition with one another.

6. A multi-channel power supply selector as claimed in claim 1, in which the controller of each channel has a power supply connection to a node disposed between the series connected first and second switching devices of the respective channel.

7. A multi-channel power supply selector as claimed in claim 1, in which the controllers communicate with one another.

8. A multi-channel power supply selector as claimed in claim 1, in which the controllers operate to select whichever supply has the largest magnitude supply voltage provided that the supply is within an acceptable voltage range.

9. A power supply selection control system, comprising:
 a first controller having first and second outputs for controlling first and second serially connected field effect transistors disposed between a first power supply and an output node;
 a second controller having first and second outputs for controlling first and second serially connected field effect transistors disposed between a second power supply and the output node, and wherein
 each pair of first and second field effect transistors is connected such that internal source-drain diodes thereof are connected in mutual opposition.

10. A power supply selection control system as claimed in claim 9, in which the first controller has a power supply connection to a node between the associated first and second serially connected field effect transistors.

11. A power supply selection control system as claimed in claim 9, in which the second controller has a power supply connection to a node between the associated first and second serially connected field effect transistors.

12. A power supply selection system as claimed in claim 9, in which each of the first and second controllers has a supply connection made to ground via a voltage dropping element.

13. A power supply selection control system as claimed in claim 9, in which the first and second controllers communicate with one another via a communications link.

14. A power supply selection control system as claimed in claim 13, in which the communications link comprises a differential current communications link.

15. A power supply selection control system as claimed in claim 9, in which one of the controllers functions as a master and is provided with a representation of the voltage of each of the power supplies.

16. A power supply selection control system as claimed in claim 9, in which each controller is arranged, when the power supply associated therewith is disconnected, to derive its power via current flowing from the output node back through an internal source-drain diode of the second transistor to a supply connection.

17. A power supply selection control system as claimed in claim 9, in which the first field effect transistors are connected to the associated power supply and function as supply selection devices.

18. A power supply selection control system as claimed in claim 9, in which the second field effect transistors are connected to the output and function to limit in-rush current and to act as further supply selection transistors to disconnect the associated supply.

19. A power supply selection control system as claimed in claim 9, wherein each controller monitors the voltage of the associated power supply via a potential divider connected between ground and the supply.

* * * * *

UNITED STATES PATENT AND TRADEMARK OFFICE
CERTIFICATE OF CORRECTION

PATENT NO. : 6,744,151 B2  Page 1 of 1
DATED : June 1, 2004
INVENTOR(S) : Jackson et al.

It is certified that error appears in the above-identified patent and that said Letters Patent is hereby corrected as shown below:

<u>Column 7,</u>
Line 53, "a" should be deleted.

Signed and Sealed this

Twenty-third Day of November, 2004

JON W. DUDAS
*Director of the United States Patent and Trademark Office*